United States Patent [19]

Aratsu

[11] Patent Number: 4,560,996

[45] Date of Patent: Dec. 24, 1985

[54] PEN RECORDER

[75] Inventor: Shuichi Aratsu, Tamayama, Japan

[73] Assignee: Alps Electric Co., Ltd., Japan

[21] Appl. No.: 603,325

[22] Filed: Apr. 24, 1984

[30] Foreign Application Priority Data

Apr. 25, 1983 [JP] Japan .................................. 58-71538

[51] Int. Cl.⁴ ........................ G01D 15/16; B41J 29/26
[52] U.S. Cl. .................................. 346/139 R; 400/18; 346/136
[58] Field of Search ...................... 346/44, 139 R, 136; 400/18

[56] References Cited

U.S. PATENT DOCUMENTS 3,345,640 10/1967 Sicking ............................ 346/139 R
4,441,109 4/1984 Fujisawa ......................... 346/139 R

*Primary Examiner*—E. A. Goldberg
*Assistant Examiner*—Gerald E. Preston
*Attorney, Agent, or Firm*—Guy W. Shoup; Gerard F. Dunne

[57] ABSTRACT

A pen recorder comprising a pen which is adapted to be placed in contact with a recording paper, a return spring which is capable of energizing a pen so that it is separated from the recording paper and a push-out means which pushes the pen so that it can be placed in contact with the recording paper. This push-out means includes a push-lever urging the pen towards the recording paper against a spring force larger than that of the return spring. During the printing operation, this push-lever is separated from the roller, while during the waiting condition, it engages the roller. Accordingly, stabilized pen feed rate and contact pressure of pen can be realized during printing operation.

6 Claims, 4 Drawing Figures

PEN RECORDER

FIELD OF THE INVENTION

This invention relates to a pen recorder found in such devices as an X-Y plotter or graphic printer.

BACKGROUND OF THE INVENTION

FIG. 1 and FIG. 2 show staple portions of conventional pen recorders. Of these figures, FIG. 1 is a partially sectional view indicating the printing condition, while FIG. 2 is a partially sectional view indicating the waiting condition. In these figures, a platen 1 has a recording paper 2 would partially therearound, and a pen 3 is carried by a carriage (not illustrated) and can be moved into contact with the recording paper 2. A return spring 4, for example a plate spring, has one end fixed to the aforementioned carriage and urges the pen 3 away from the recording paper 2. The end tip 5 of pen 3 fits within a hole 6 of the plate spring 4. In addition, a hammer 7 is provided for engaging the rear end portion 8 of the pen 3 to urge the pen into contact with the recorder paper 2, and is supported rotatably by the aforementioned carriage through the pivot 9. A freely rotatable roller 10 is carried by the hammer 7, and a push-lever 11 extends parallel to the axis of the platen 1 in a position to engage the roller 10. This push-lever is caused to rotate, about the pivot 12, for example by a solenoid (not illustrated), to pivot the hammer towards the platen 1 and urge the pen 3 against the recording paper 2.

In the above pen recorder, at the time of printing on the recording paper 2, the push-lever 11 pivots against the roller, as indicated by the arrow 13 of FIG. 1. Simultaneously, the hammer 7 pivots as indicated by the arrow 14 with a pressure caused by the push-lever 11, followed by the pen 3 being pushed towards the recording paper 2 as indicated by the arrow 15, against the resilient force of the plate spring 4. In this way, the pen 3 contacts appropriate portions of the recording paper 2. For example, the carriage carrying the pen 3, plate spring 4, hammer 7, axle 9 and roller 10 may move in the axial direction of platen 1 or the recording pen 2 may be fed in the circumferential direction of the platen 1. Thereby, desired printing is carried out on the recording paper 2 by means of the pen 3. While the carriage is moving, the roller 10 continuously rotates in contact with the push-lever 11, suppressing a sliding resistance between the roller and push-lever 11.

In the waiting condition, the push-lever 11 rotates in the direction indicated by the arrow 16 of FIG. 1 and thereby the push-lever 11 is separated from the roller 10, while the pen 3 moves away from the recording paper by the resilient force of the plate spring 4, that is in the direction indicated by the arrow 17 of FIG. 1. When the pen 3 moves away from the recording paper 2, the hammer 7 pivots as indicated by the arrow 18 of FIG. 1, resulting in the condition as shown in FIG. 2.

In a pen recorder constituted as described above, the contact pressure between the pen 3 and recording paper 2 during printing is determined by the accuracy of positioning the pen 3, namely the amount of movement of the hammer 7 and the amount of rotation of the push-lever 11. In addition, as described above, the push-lever 11 extends longitudinally in the axial direction of the platen 1 and, therefore, it may easily deflect in its longitudinal direction.

Therefore, such conventional pen recorders inevitably encounter the defects that the amount of rotation of hammer 7 may change in accordance with the amount of deflection generated on the push-lever 11, to deteriorate the positioning accuracy of pen 3. The contact pressure of pen 3 to the recording paper 2 thus easily becomes unstable, and the thickness of lines printed by such recording pen 3 fluctuates to lower printing quality.

Moreover, the push-lever 11 of such conventional pen recorder is held in contact with the roller 10 during the printing operation, and, consequently, a sliding resistance is generated between the push-lever 11 and the roller 10. Accordingly, the rate of movement of the carriage is restricted by such sliding resistance, making high speed printing difficult.

Furthermore, such sliding resistance between the push-lever 11 and roller 10 may change in accordance with a deflection generated on the push-lever, as mentioned above, and the rate of movement of the carriage, namely pen feeding rate, easily becomes unstable, resulting in deterioration of the printing quality.

SUMMARY OF THE INVENTION

An object of the present invention is to provide a pen recorder having a relatively stable contact pressure between the pen and the recording paper, as well as a relatively stable rate of movement for the pen across the recording paper.

In order to attain such objects, the present invention includes a pen which can be held in contact with a recording paper, and a return spring which urges this pen away from the recording paper. A push-out means is adapted to press the pen so that it can be brought into contact with the recording paper, and this put-out means includes a push-out spring which urges the pen towards the recording papers and has a resilient force larger than that of the return spring.

BRIEF DESCRIPTION OF THE DRAWINGS

FIG. 1 and FIG. 2 indicate the staple portions of a conventional pen recorder, wherein FIG. 1 is a side view including a partial sectional view indicating the printing condition, while FIG. 2 is a side view including a partial sectional view indicating the waiting condition.

FIG. 3 and FIG. 4 show the staple portions of an embodiment of a pen recorder of this invention, wherein FIG. 3 is a side view including a partial sectional view indicating the printing condition, and FIG. 4 is a side view including a partial sectional view indicating the waiting condition.

DETAILED DESCRIPTION OF THE INVENTION

Figure 1:
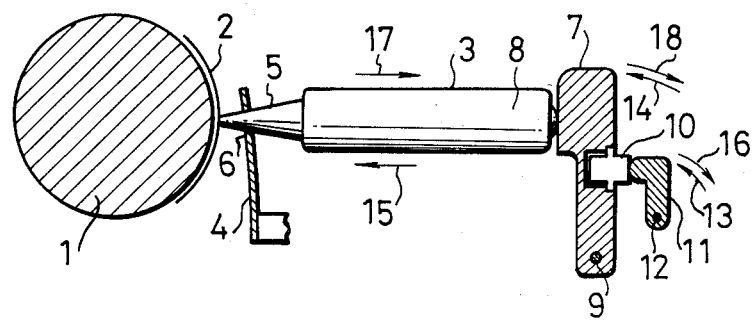
Figure 2:
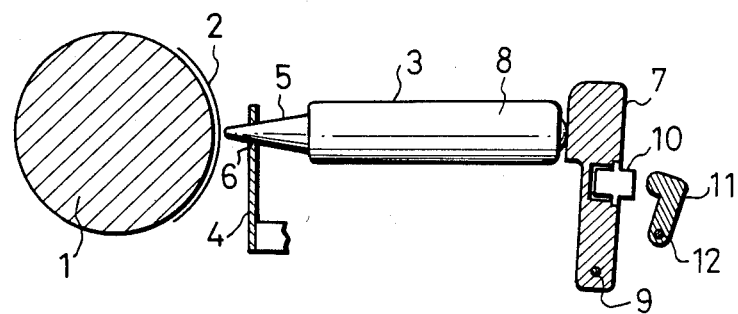

A pen recorder according to the present invention is described in detail with reference to FIG. 3 and FIG. 4 wherein components similar to the known device of FIGS. 1 and 2 are labeled by similar reference numerals.

The pen recorder of the present invention includes a hammer capable of pressing the end portion 8 of the pen 3. This hammer can rotate around the pivot 21 supported by a carriage not illustrated, and is comprised of an upper portion 22 and a lower portion 23 found on respective sides of the pivot 21. A push-out spring 24 has one end engaged with the upper portion 22 of hammer 20, while the other end is engaged with the carriage so as to urge the hammer 20 to press the pen 3 against the recording paper 2. The resilient force of such push-out spring 24 is set larger than that of the plate spring 4. A roller 25 is rotatably provided on the lower portion 23 of hammer 20, while a push-lever 26 is arranged opposite the roller 25 so it can be brought into contact therewith. The push-lever 26 extends parallel to the axial direction of the platen 1. This push-lever 26 is further caused to rotate, for example, by a solenoid not illustrated around the pivot 27. The pivot 27 is fixed to the body, not illustrated of the recorder.

The abovementioned hammer 20, pivot 21, roller 25, push-out spring 24, push-lever 26 and pivot 27 form a push-out means which press the pen 3 into contact with the recording paper 2 on demand.

In the pen recorder thus constituted, the push-lever 26 is rotated in the direction of the arrow 28 so as to be separated from the roller 25 during the printing operation so that the hammer 20 rotates in the direction indicated by the arrow 29 in accordance with the difference between the resilient forces of push-out spring 24 and the plate spring 4. In this way, the pen 3 is pressed towards the recording paper 2 with a relatively constant force determined by the springs 4 and 24, as the pen 3, plate spring 4, hammer 20, pivot 21, roller 25 and push-out spring 24 move integrally with the carriage in the axial direction of the platen 1, or the recording paper 2 is fed in the circumferential direction of platen 1. The desired printing is thus carried by the pen 3 on the recording paper 2 with the roller 25 being separated from the push-lever 26.

Figure 3:
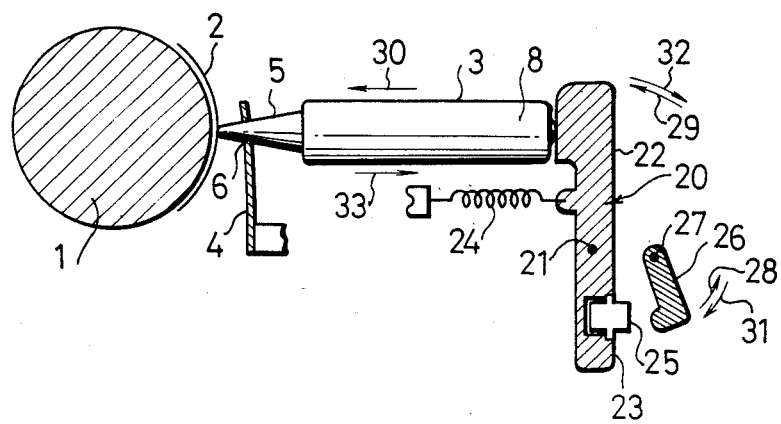
Figure 4:
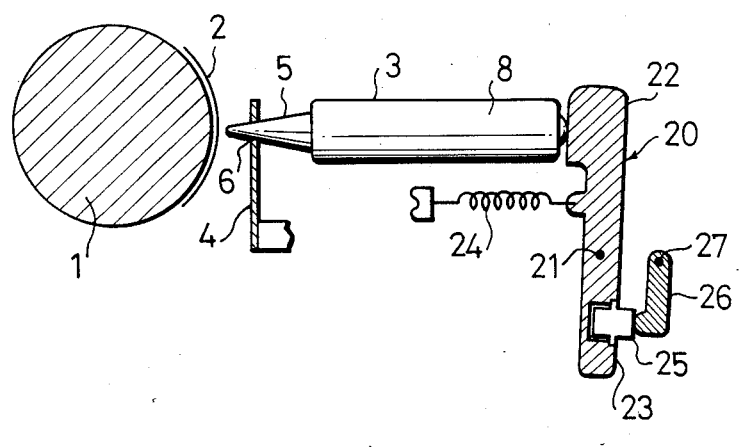

In the waiting condition, the push-lever 26 rotates in the direction indicated by arrow 31 in FIG. 3. Thereby, the push-lever 26 abuts against the roller 25. Simultaneously, the hammer 20 rotates as indicated by arrow 32 of FIG. 3 against the force resulting from the difference between the resilience of the push-out spring 24 and plate spring 4 in accordance with a pressure generated by the push-lever 26. Thereby, the pen 3 moves away from the recording paper 2, namely in the direction indcated by arrow 33 of FIG. 3, owing to the resilient force of the plate spring 4, as indicated in FIG. 4.

In such an embodiment thus constituted, the push-lever 26 is kept separated from the roller 25 during the printing operation and therefore the pen 3 can be positioned with high accuracy in accordance with the difference between the resilient forces of the push-out spring 24 and plate spring 4 through the hammer 20 without receiving any influence from deflection generated on the push-lever 26. Accordingly, the contact pressure of the pen 3 to the recording paper 2 can be stabilized.

Moreover, as described above, the push-lever 26 is kept separated from the roller 25 during printing so that sliding resistance is not generated therebetween and, therefore, the speed of movement of the carriage and pen is not usually restricted.

Further, since a sliding resistance is not generated between the push-lever 26 and the roller 25 during the printing operation, there is little fear of generating a change in the carriage feed rate, namely in the pen feed rate, due to a change of sliding resistance, and accordingly the feed rate of the pen 3 can be stabilized.

A pen recorder of this invention thus stabilizes the pen feed rate and contact pressure of the pen to the recording paper during the printing operation and, therefore, ensures improvement in the printing quality as compared with conventional printing operation. In addition, limitations on pen feed rate during the printing operation can also be alleviated, realizing a higher speed for the printing operation.

What is claimed is:

1. A pen recorder comprising a pen adapted to be brought into contact with a recording paper, means including a return spring held to said pen for urging it in the direction away from said recording paper and a push-out means for pressing said pen into contact with the recording paper, and push-out means including control means coacting with a push-out spring for urging said pen into contact with the recording paper and having a force larger than that of said return spring.

2. A pen recorder according to claim 1 wherein said push-out means includes a rotatable hammer, biased by said push-out spring, having one end adapted to be placed in contact with said pen, and said control means including a push-lever adapted to engage the other end thereof for moving said hammer in opposition to the force applied by said push-out spring.

3. A pen recorder according to claim 2, wherein said hammer includes a roller at the area contacting said push-lever.

4. A pen recording according to claim 2, wherein said push-out means includes a push-lever which is not in contact with the hammer while said pen is in contact with the recording paper for printing operation but is in contact with the hammer while said pen is not in contact with the hammer.

5. A pen recorder according to claim 1, which can be used as a plotter.

6. A pen recorder according to claim 1, which can be used as a printer.

* * * * *